Patented May 8, 1928.

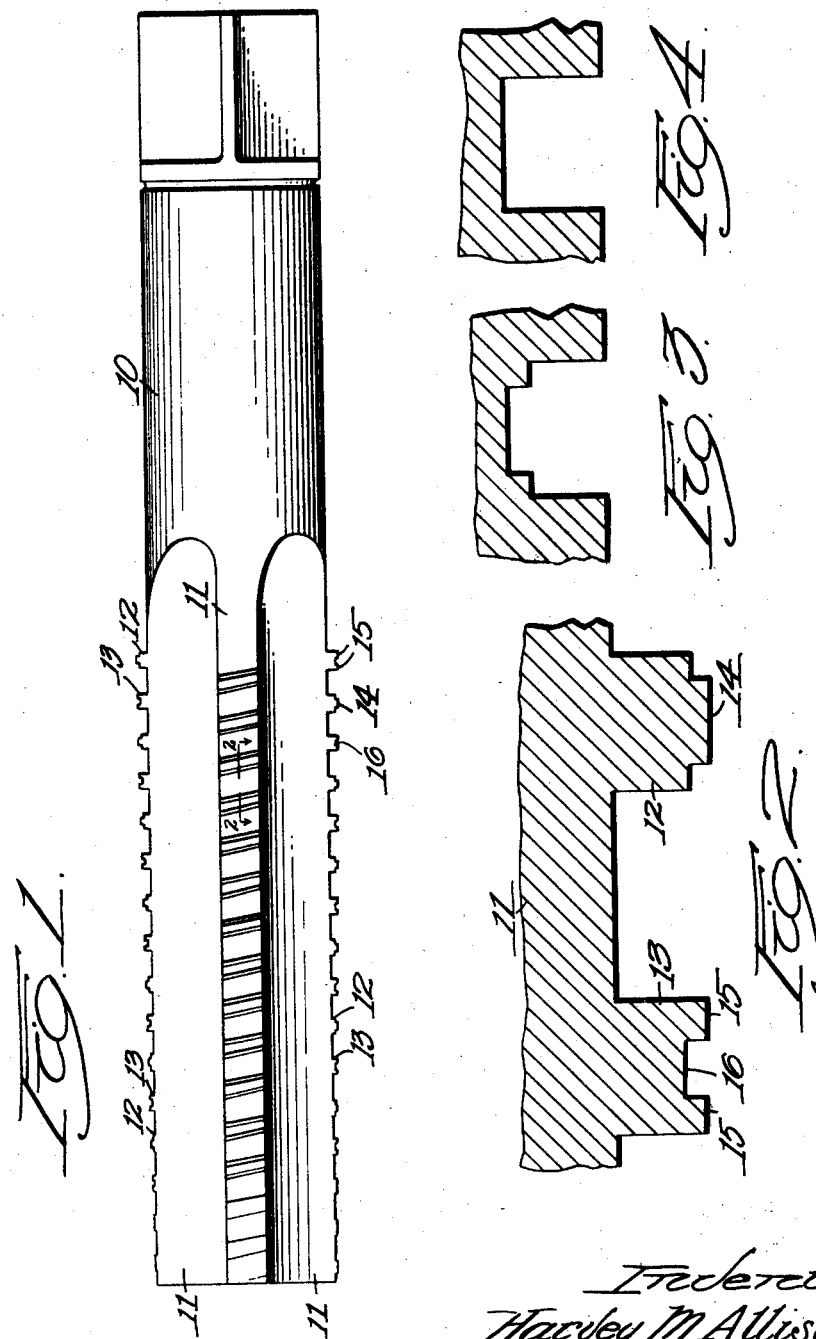

1,668,751

UNITED STATES PATENT OFFICE.

HARVEY M. ALLISON, OF WORCESTER, MASSACHUSETTS, ASSIGNOR TO JOHN BATH & COMPANY, INC., OF WORCESTER, MASSACHUSETTS, A CORPORATION OF MASSACHUSETTS.

ROUGHING TAP.

Application filed April 4, 1927. Serial No. 180,715.

This invention relates to a tap for cutting square or Acme threads or other screw threads of similar cross section, in the cutting of which a relatively large amount of stock must be removed.

It is the object of my invention to provide a tap for such purposes in which successive teeth are of differing cross section, so that the heavy chips are broken up, the cutting rate is greatly increased, and the breakage of taps is correspondingly reduced.

A preferred form of the invention is shown in the drawings in which

Fig. 1 is a side elevation of my improved tap;

Fig. 2 is an enlarged partial longitudinal sectional view, taken along the line 2—2 in Fig. 1; and Figs. 3 and 4 are detail views showing the thread sections cut by successive teeth.

The tap shown in the drawing is a double thread tap, but the invention may be similarly applied to a tap having a single or triple thread.

Referring to the drawings, I have shown a tap 10 having four lands or threaded portions 11, each provided with cutting teeth 12 and 13. The teeth 12 are ribbed or provided with center projections 14 (Fig. 2) and the teeth 13 are provided with corner projections 15 (Fig. 2) and with a central groove 16.

Where a double thread is used, the two threads are preferably started so that alternate teeth along each land are differently shaped. In other words, in moving lengthwise of a land, a grooved tooth is found to alternate with a ribbed tooth throughout the length of the tap.

In a tap having a single thread, this same result will be attained if the tap has an odd number of lands, but if a single thread tap has an even number of lands, all of the teeth on one land will be projecting or ribbed and all of the teeth on the next adjacent land will be grooved.

In any event, the two forms of teeth will alternate along the thread spiral, this being the really important consideration. In cutting a thread, the projection 14 of a tooth 12 removes a center chip from the bottom of the thread and the corner portions 15 of the next succeeding tooth 13 remove the corners from the bottom of the thread and preferably cut the thread slightly deeper at the corners than in the center.

The teeth thus alternately remove the center and edge portions of the thread, and vary the chip formation from tooth to tooth, so that the heavy chips are broken up into many small pieces and the strain upon the teeth of the tap is very greatly reduced.

The tooth shown in the drawings is of the square thread type but a corresponding construction may be provided in threads of Acme or other similar cross section.

It has been found that a tap thus provided with teeth of alternate cross section will cut square and Acme threads, or other threads involving the removal of large amounts of stock, much more easily and rapidly than has been heretofore possible, and furthermore that the drag of the tap is so much less that breakage of taps is substantially eliminated.

While I have shown the teeth as alternately provided with a rectangular projection and a rectangular groove, it will be understood that this specific outline may be substantially varied without departing from the spirit and scope of my invention and I do not wish to be limited to the details herein disclosed otherwise than as set forth in the claims.

What I claim is:—

1. A roughing tap for cutting square, Acme or similar threads having successive cutting teeth of differing cross section, each alternate tooth along the cutting spiral having a cenral cutting projection and the remaining teeth having corner cutting projections.

2. A roughing tap for cutting square, Acme or similar threads having successive cutting teeth of differing cross section, said teeth being so shaped that each alternate tooth along the cutting spiral removes a center portion only from the bottom of the thread, and the remaining teeth remove corner portions only from the bottom of the thread.

3. A roughing tap for cutting square, Acme or similar threads having successive cutting teeth of differing cross section, said teeth being so shaped that each alternate tooth along the cutting spiral is ribbed to remove a center portion from the bottom of the thread, and the remaining teeth are grooved and remove the side portions left by the first-mentioned teeth at the bottom of the thread.

4. A roughing tap for cutting square, Acme or similar thread of double pitch, said tap having successive teeth along each cutting spiral of differing cross section, each alternate tooth having a central cutting projection and the remaining teeth having side cutting projections, and adjacent teeth along each land of the tap being also of alternate cross section.

In testimony whereof I have hereunto affixed my signature.

HARVEY M. ALLISON.